3,255,270
PRODUCTION OF ACETYLENE
Walter Teltschik, Frankenthal, Pfalz, Germany, assignor to Badische Anilin- & Soda-Fabrik Aktiengesellschaft, Ludwigshafen (Rhine), Germany
No Drawing. Filed Dec. 1, 1964, Ser. No. 415,156
Claims priority, application Germany, Dec. 7, 1963, B 74,588
3 Claims. (Cl. 260—679)

The present invention relates to a process for the production of acetylene. It relates particularly to a process for cooling hot gases containing acetylene, such as are formed in the production of acetylene from hydrocarbons. Cooling is effected according to this invention with a cooling liquid containing naphthalene which is sprayed into the hot gas containing acetylene from a special spray nozzle.

It is known that acetylene may be produced by thermal cracking of hydrocarbons. For this purpose, the preheated hydrocarbon is introduced into a reactor and brought to high temperatures by means of a hot carrier gas, by means of partial oxidation or by means of electrical energy and thus converted into gas containing acetylene which is quenched to low temperatures at the end of the reactor with water.

It is also known that naphthalene or hydrocarbons containing naphthalene may be used for quenching the hot gas containing acetylene. Owing to the thermal stability of naphthalene the hot gas which is at about 1,500° C. may be quenched to about 200° C. in one stage. The heat of the gas may be utilized in a waste heat boiler for the production of steam. Moreover the carbon black entrained in the gas is absorbed by the naphthalene and may be recovered as petroleum coke by evaporating the naphthalene. This method is only economical, however, if the carbon black content in the naphthalene is high. The naphthalene for quenching the hot cracked gas is therefore recycled and only so much naphthalene containing carbon black is removed from the cycle and regenerated that the carbon black content of the recycled naphthalene is about 20% or more.

It is further known that a system of atomizers and jets arranged in rings may be used for quenching the hot acetylene-containing gas with water at the end of the reactor. Nozzles having an axial feed and an insert imparting a twisting motion have proved to be suitable as atomizers. If such nozzles are operated with naphthalene containing carbon black as the quenching medium, deposits form in the nozzles and effective quenching of the hot cracked gas is no longer ensured. The consequence is that there is a lowering of the acetylene yield and the occurrence of secondary reactions at the point of quenching and in the apparatus arranged after the same.

I have now found that the said difficulties occurring in quenching with naphthalene containing black carbon or aromatic hydrocarbons containing naphthalene and carbon black do not arise when a spray nozzle is used which has the form of a hollow circular cylinder open at one end into which the quenching medium enters tangentially. Troublefree continuous operation is possible for long periods with such a nozzle. Particularly good results are achieved when the pressure in the spray nozzle is at least one tenth, for example about one tenth to half, of the pressure ahead of the nozzle. Under these conditions, the spray nozzle remains completely clean, no secondary reactions take place at the point of quenching or thereafter and the temperatures of the acetylene-containing gas and the quenching medium are equal after the quenching. Complete heat exchange therefore takes place.

By quenching hot acetylene-containing gas with naphthalene containing carbon black or aromatic hydrocarbons containing naphthalene and carbon black in accordance with this invention, the same effect is achieved as with water. In particular, the carbon black content of the naphthalene may be 20% by weight or more, for example 20 to 40% by weight, so that the advantage of quenching with naphthalene, as described above, may be fully utilized.

The spray nozzles may advantageously be arranged in conventional fashion in one or more rings. The spray nozzles may also be used with jets through which additional naphthalene containing carbon black is sprayed. The jets may be operated so that the naphthalene penetrates as a compact stream to about the middle of the current of gas where the stream is broken up. It has proved to be advantageous to provide the jets with a conical feed to avoid carbon black and deposits of solids rich in carbon black in the jets. The temperature of the naphthalene containing carbon black entering the nozzles is advantageously higher than 160° C., particularly at 170° to 250° C.

The invention is illustrated by the following example.

*Example*

1,000 cubic meters (S.T.P.) of acetylene-containing gas is produced per hour at a temperature of about 1,500° C. from methane and oxygen in an acetylene burner. The cracked gas is quenched with 35 cubic meters per hour of naphthalene containing 20% of carbon black and having a temperature of 180° C. as it leaves the reactor. The pressure of the naphthalene containing carbon black is 3 atmospheres gauge ahead of the spray nozzle. When using spray nozzles having axial feed, continuous operation is impossible. After a few days, the nozzles clog up and deposits of polymers containing carbon black form at the point of quenching. When using spray nozzles in the form of hollow circular cylinders with tangential feed and a pressure in the nozzles of 0.5 atmosphere gauge, troublefree continuous operation is possible for several months. The nozzles and the quenching chamber remain clean. The content of acetylene is equivalent to the content obtained when quenching the hot gas with naphthalene free from carbon black or with water. The same effect is achieved by using hydrocarbons containing naphthalene and carbon black as the quenching medium.

I claim:

1. A process for the production of acetylene-containing gases by thermal cracking of hydrocarbons in a reactor and quenching the hot acetylene-containing gas at the end of the reactor with a liquid selected from the group consisting of naphthalene containing carbon black and aromatic hydrocarbons containing naphthalene and carbon black which is sprayed into the hot acetylene-containing gas, wherein a spray nozzle is used which has the form of a hollow circular cylinder open at one end into which the quenching medium enters tangentially.

2. A process as claimed in claim 1 wherein the pressure in the spray nozzle is not less than one tenth of the pressure ahead of the nozzle.

3. A process as claimed in claim 1 wherein the pressure in the nozzle is from one tenth to one half of the pressure ahead of the nozzle.

References Cited by the Examiner

UNITED STATES PATENTS

| | | | |
|---|---|---|---|
| 1,896,552 | 2/1933 | Millar | 260—679 |
| 2,985,695 | 5/1961 | Platz et al. | 260—676 |

ALPHONSO D. SULLIVAN, *Primary Examiner.*